United States Patent
Polidori et al.

(10) Patent No.: US 10,399,611 B2
(45) Date of Patent: Sep. 3, 2019

(54) REAR AERODYNAMIC STRUCTURE FOR CARGO BODIES AND ACTUATION MECHANISM FOR THE SAME

(71) Applicant: Stemco Products, Inc., Charlotte, NC (US)

(72) Inventors: Michael W. Polidori, Hayward, CA (US); Jeffrey J. Grossmann, Berkeley, CA (US); Austin A. Duncanson, San Francisco, CA (US); James Matthew Barron, Chattanooga, TN (US); Kyle A. Sager, Chattanooga, TN (US)

(73) Assignee: STEMCO PRODUCTS, INC., Charlotte, NC (US)

( * ) Notice: Subject to any disclaimer, the term of this patent is extended or adjusted under 35 U.S.C. 154(b) by 0 days.

(21) Appl. No.: 15/558,251

(22) PCT Filed: Mar. 22, 2016

(86) PCT No.: PCT/US2016/023629
§ 371 (c)(1),
(2) Date: Sep. 14, 2017

(87) PCT Pub. No.: WO2016/154224
PCT Pub. Date: Sep. 29, 2016

(65) Prior Publication Data
US 2018/0043943 A1 Feb. 15, 2018

Related U.S. Application Data
(60) Provisional application No. 62/136,946, filed on Mar. 23, 2015.

(51) Int. Cl.
*B62D 35/00* (2006.01)
(52) U.S. Cl.
CPC .................. *B62D 35/001* (2013.01)
(58) Field of Classification Search
CPC ................................... B62D 35/001
USPC .................... 296/180.1, 180.2, 180.3, 180.5
See application file for complete search history.

(56) References Cited

U.S. PATENT DOCUMENTS

| | | |
|---|---|---|
| 4,214,787 A | 7/1980 | Chain |
| 4,611,847 A | 9/1986 | Sullivan |
| 5,106,137 A | 4/1992 | Curtis |
| 8,696,047 B2 | 4/2014 | Nusbaum |
| 9,855,982 B2 * | 1/2018 | Baker .................. B62D 35/001 |
| 2014/0019010 A1 | 1/2014 | Smith et al. |
| 2014/0367993 A1 | 12/2014 | Breidenbach |
| 2017/0021873 A1 * | 1/2017 | Dieckmann .......... B62D 35/001 |

OTHER PUBLICATIONS

PCT Application No. PCT/US2016/023629, International Search Report and Written Opinion dated Jun. 16, 2016, 8 pages.

\* cited by examiner

*Primary Examiner* — Joseph D. Pape
(74) *Attorney, Agent, or Firm* — Perkins Coie LLP

(57) ABSTRACT

Embodiments of the disclosure are directed to a deployable aerodynamic structure for a cargo body of a vehicle. The aerodynamic structure can include one or more panels that can be mounted to a cargo body of a vehicle and can move between a retracted position and a deployed position using various automated actuation systems.

20 Claims, 12 Drawing Sheets

REAR AERODYNAMIC STRUCTURE FOR CARGO BODIES AND ACTUATION MECHANISM FOR THE SAME

RELATED APPLICATIONS

This application is a 35 USC § 371 National Stage application of International Application No. PCT/US2016/023629, entitled "REAR AERODYNAMIC STRUCTURE FOR CARGO BODIES AND ACTUATION MECHANISM FOR THE SAME," filed on Mar. 22, 2016, which claims priority to U.S. Provisional Patent Application Ser. No. 62/136,946, filed Mar. 23, 2015, the disclosures of which are incorporated herein by reference in their entireties for all purposes.

FIELD OF THE INVENTION

The present technology relates to aerodynamic structures for truck and trailer bodies and other large cargo vehicles, and more particularly to actuation and control of deployment and retraction of such aerodynamic structures.

BACKGROUND OF THE INVENTION

Trucking is the primary mode of long-distance and short-haul transport for goods and materials in the United States, and many other countries. Trucks typically include a motorized cab in which the driver sits and operates the vehicle. The cab is attached to a box-like cargo section. Smaller trucks typically include an integral cargo section that sits on a unified frame which extends from the front wheels to the rear wheel assembly. Larger trucks often include a detachable cab unit with multiple driven axles, and a separate trailer with a long box-like cargo unit seated atop two or more sets of wheel assemblies. These truck assemblages are commonly referred to as "semi-trailers" or "tractor trailers." Most modern trucks' cabs, particularly those of tractor trailers, have been fitted with aerodynamic fairings on their roof, sides and front. Among other things, these fairings assist in directing air over the exposed top of the box-like cargo body, which typically extends higher (by several feet) than the average cab roof. The flat, projecting front face of a cargo body is a substantial source of drag. The use of such front-mounted aerodynamic fairings in recent years has significantly lowered drag and, therefore, raised fuel economy for trucks, especially those traveling at high speed on open highways.

However, the rear end of the truck's cargo body has remained the same throughout its history. This is mainly because most trucks include large swinging or rolling doors on their rear face. Trucks may also include a lift gate or a lip that is suited particularly to backing the truck into a loading dock area so that goods can be unloaded from the cargo body. It is well-known that the provision of appropriate aerodynamic fairings (typically including an inwardly tapered set of walls) would further reduce the aerodynamic profile of the truck by reducing drag at the rear face. The reduction of drag, in turn, increases fuel economy.

Nevertheless, most attempts to provide aerodynamic structures that integrate with the structure and function of the rear cargo doors of a truck have been unsuccessful and/or impractical to use and operate. Such rear aerodynamic structures are typically large and difficult to remove from the rear to provide access to the cargo doors when needed. One approach is to provide a structure that swings upwardly, completely out of the path of the doors. However, aerodynamic structures that swing upwardly require substantial strength or force to be moved away from the doors, and also require substantial height clearance above an already tall cargo body. Other solutions have attempted to provide an aerodynamic structure that hinges to one side of the cargo body. While this approach requires less force to move, it also requires substantial side clearance—which is generally absent from a closely packed, multi-truck loading dock.

For useful background information on aerodynamic structures for swinging cargo doors, refer to commonly assigned U.S. Pat. No. 8,100,461, issued Jan. 24, 2012, by Smith et al., and U.S. Pat. No. 8,360,509, issued Jan. 29, 2013, by Smith et al., which are both incorporated herein by reference in their entireties for all purposes. Among other things, these patents describe various structures that provide deployable rear aerodynamic structures to swinging cargo body rear doors. Notably, these structures allow the aerodynamic panels to be folded against the door in a retracted position so the door can be opened normally (swung to the side of the cargo body). The panels are deployed when the vehicle moves at highway speed. Various actuators, both manually operated and powered, move the doors between the retracted and the deployed positions. The panels can be joined together with a variety of hinged folding arrangements (e.g., a diagonal hinge running across each top panel) so that the panels deploy (unfold) and/or retract (fold) concurrently. Linkages, such as swingarm structures, can be used to tie the top and side panels together and assist in concurrent motion between retracted and deployed positions.

SUMMARY

The technology of the present application overcomes certain disadvantages of the prior art by providing an actuation system for aerodynamic panels mounted on the rear of a vehicle. The actuation systems described can deploy the aerodynamic panels when the vehicle moves and retract the aerodynamic panels when the vehicle is docked using a variety of automated actuation systems. Not only are the systems easy to use and maintain, but also, the systems exhibit durability/long-life. Moreover, the actuation systems described are compatible with existing vehicle power and control systems.

Embodiments of the present technology use actuators to deploy and retract the panels with respect to the rear doors of the vehicle.

Embodiments of the present technology include a deployable aerodynamic structure for a cargo body of a vehicle. The aerodynamic structure can include one or more panels configured to be mounted to the cargo body and movable between a retracted position and a deployed position. In the deployed position, the one or more panels can be configured to extend rearwardly away from the cargo body. The aerodynamic structure can include at least one passive actuator coupled to one of the one or more panels and to a rear of the cargo body. The at least one passive actuator can be operable to bias the one or more panels toward the deployed position using a biasing force. The aerodynamic structure can further include at least one active actuator coupled to one of the one or more panels and to the rear of the cargo body that can be operable to overcome the biasing force to move the one or more panels toward the retracted position.

The at least one active actuator can be operable to retract the one or more panels in response to receiving a signal, and the signal can be received responsive to a speed of the vehicle. In some embodiments, the at least one active actuator is one of a pneumatic actuator, hydraulic actuator, and an electric actuator and the at least one passive actuator at least one of a spring-loaded cable, gas spring, spring-loaded hinges and mechanical spring. In some embodiments, the at least one active actuator is a pneumatic actuator and the at least one passive actuator is a gas spring mechanism.

In some embodiments, the one or more panels includes a top panel and a side panel configured to be hingedly mounted respectively on each of a first door and a second door of a pair of doors on the rear of the cargo body. The top panel can include a hinge that divides the top panel into an inner top panel and an outer top panel, and the outer top panel can be configured to be hingedly attached to the side panel. In some embodiments, the one or more panels includes a bottom panel. The bottom panel can include a hinge that divides the bottom panel into an inner bottom panel and an outer bottom panel, and the outer bottom panel can be configured to be hingedly attached to the side panel.

In some embodiments, the deployable aerodynamic structure further includes a linkage assembly mounted between the cargo body and one of the one or more panels, where the linkage assembly is coupled to the top panel and the cargo body, and where the at least one active actuator and/or the at least one passive actuator is coupled to the one of the one or more panels via the linkage assembly so that the top panel and the side panel retract concurrently. In some embodiments, the deployable aerodynamic structure includes a bottom panel and the linkage assembly is coupled to the top panel and the cargo body. The at least one active actuator and/or the at least one passive actuator can be coupled to the one of the one or more panels via the linkage assembly so that the top panel (and/or the side panel) and the bottom panel retract concurrently.

In some embodiments, the linkage assembly is coupled to the top panel and the side panel, where the at least one active actuator is coupled to the one of the one or more panels via the linkage assembly so that the top panel and the side panel retract concurrently, and where in the retracted position, the outer top panel folds over the inner top panel. In some embodiments, in the retracted position, the side panel overlies the top panel. In some embodiments, the linkage assembly is coupled to a bottom panel and the top panel (and/or the side panel).

In some embodiments, the at least one active actuator and/or the at least one passive actuator is coupled directly to one or more panels. The retracted position can include a fully retracted position and a partially retracted position, where in the fully retracted position, the one or more panels are folded against the rear of the cargo body.

The technology of the disclosure further describes an aerodynamic structure for a vehicle body that includes a panel hingedly mounted on the vehicle body, and at least one inflatable air bladder that is pivotally connected between a portion of the vehicle body and the panel that, in an inflated orientation, maintains the panel in a desired deployed position and that is constructed and arranged to absorb predetermined shock with hinged movement of the panel against biasing pressure of the air bladder.

In some embodiments, the aerodynamic structure further includes a valve that depressurizes the air bladder in response to a predetermined impact force on the panel. In some embodiments, the panel is an aerodynamic side skirt.

In some embodiments, an actuator can be a fluid/pneumatic muscles that are inflated to deploy the panels and deflated to retract the panels. The muscle is shaped as an elongated tube or bladder with a cylindrical or similar (e.g. ovular) cross-section shape. The muscle includes opposing tapered ends with mounting loops at each end to receive bolts or other pivoting clevis pin members. The muscle is attached between a mounting (pivot) location on the door and a mounting (pivot) location on the panel.

During deployment of the panel, the muscle is pressurized with fluid (i.e., liquid or gas) from a pressure source on the vehicle, and inflates to define an extended and rigid position that biases the opposing mounting points away from each other and causes the panel to swing outwardly on its hinges from a retracted position to a deployed position. During retraction of the panel, fluid is expelled from the muscle as the muscle folds, which compresses and flattens as the panel is returned to the retracted position against the vehicle door. A variety of return mechanisms (e.g., cables, mechanical springs, gas springs) can be used to assist in retraction of the panels when the muscle is depressurized. Pressure can be sourced from the vehicle's on-board air pressure system (e.g., used to power vehicle brakes) under control of the vehicles Electronic Control Unit ("ECU") and antilock brake system ("ABS").

In an illustrative embodiment, a rear deployable aerodynamic structure for a vehicle cargo body is provided. The structure includes panels mounted to the cargo body and movable between (a) a retracted position folded against the rear of the cargo body and (b) a deployed position extended rearwardly away from the cargo body. The structure further includes at least a first fluid muscle that, when pressurized, moves from a compressed state to an extended state. The muscle is operatively connected to each of the cargo body and at least one of the panels so that it moves at least one of the panels from the retracted position to the deployed position. A pressure source selectively pressurizes the muscle to extend the muscle. Illustratively, the panels comprise a top panel and a side panel hingedly mounted, respectively, on each of a first swinging door and a second swinging door of a pair of swinging doors on the rear of the cargo body. The pressure source includes a controller that selectively provides pressure to the muscle based upon a signal. The signal can be responsive to a speed of the vehicle.

In some embodiments, the top panel can include multiple portions. For example, the top panel can include a hinge that divides the top panel into an inner top panel and an outer top panel. The outer top panel can be hingedly attached to the side panel. Illustratively, the first muscle can be pivotally attached between the first swinging door and the side panel, and the second muscle can be pivotally attached between the first swinging door and the top panel. A return mechanism illustratively biases the panels to a retracted position when the first muscle is depressurized. The return mechanism can comprises at least one of a spring-loaded cable, a gas spring, spring-loaded hinges and mechanical spring(s). In an embodiment, a swingarm assembly is mounted between the body and the panels. The first muscle can be pivotally mounted between the body and the swingarm assembly.

In another illustrative embodiment, a panel is hingedly mounted on the vehicle body, and at least one inflatable air bladder is pivotally connected between a portion of the vehicle body and the panel. In an inflated orientation, the air bladder maintains the panel in a desired deployed position, and is constructed and arranged to absorb predetermined shock with hinged movement of the panel against biasing pressure of the air bladder. The arrangement can include a valve assembly that depressurizes (deflates) the air bladder in response to an impact force on the panel. In various embodiments, the panel can be rigid and can be an aerodynamic side skirt.

BRIEF DESCRIPTION OF THE DRAWINGS

The description below refers to the accompanying drawings, of which.

DETAILED DESCRIPTION

Figure 1:
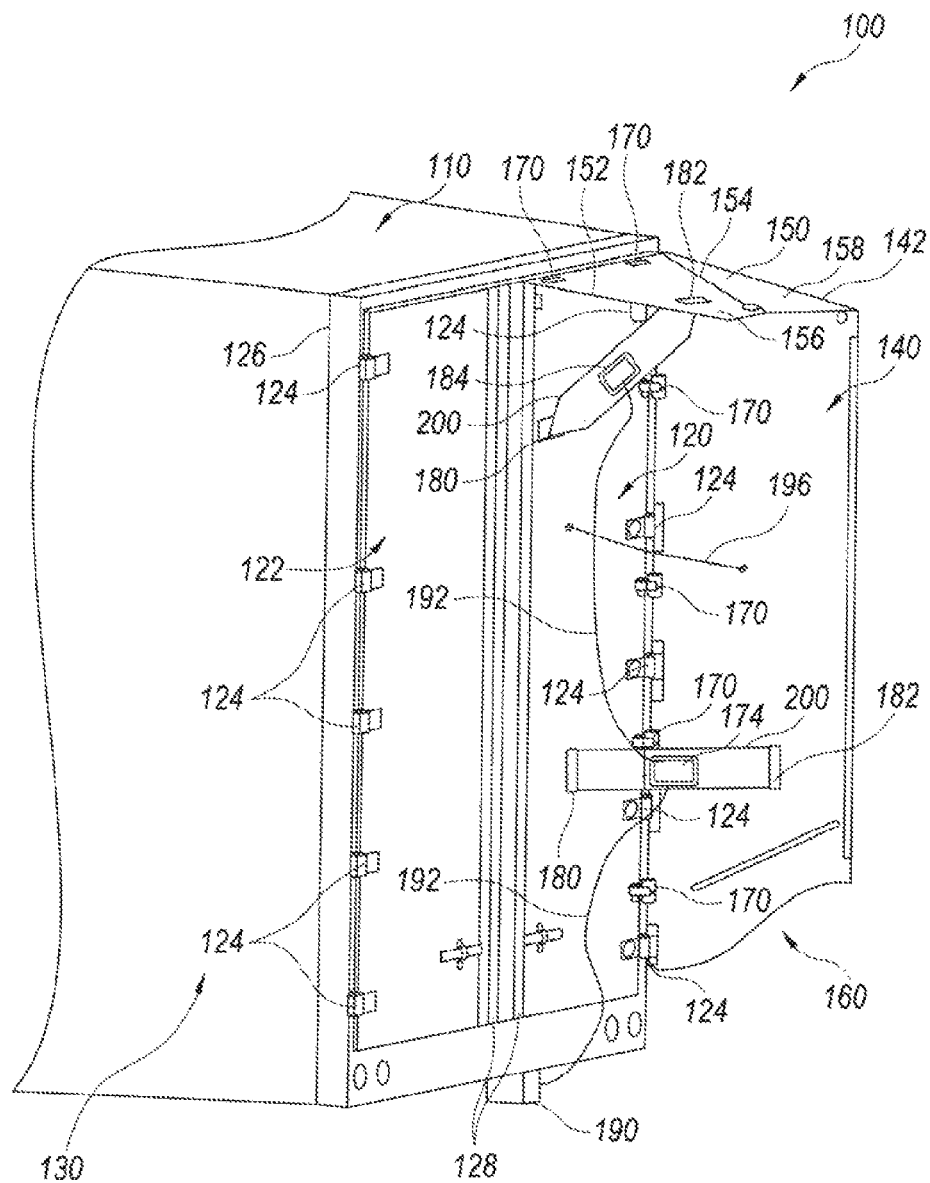
FIG. 1 is a perspective view of a swinging rear door arrangement on a vehicle (e.g., truck trailer) cargo body, including an aerodynamic panel assembly for one door, which uses fluid muscles to deploy the panels according to an illustrative embodiment, with panels shown in a deployed position.

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following description is, therefore, not to be taken in a limiting sense.

The technology of the present application is described with specific reference to the rear end of a cargo body for a tractor trailer. However, one of ordinary skill in the art upon reading the disclosure will now understand that the technology of the present application is applicable to other vehicles and moving objects having generally vertical rear ends, such as, for example, railcars, buses, integral truck/trailers, semi-trailer bodies, intermodal containers, panel trucks and the like. Moreover, the technology of the present application will be described with relation to illustrative or exemplary embodiments. The words "illustrative" or "exemplary" are used herein to mean "serving as an example, instance, or illustration." Any embodiment described herein as "illustrative" or "exemplary" is not necessarily to be construed as preferred or advantageous over other embodiments.

Additionally, unless specifically identified otherwise, all embodiments described herein should be considered exemplary. The particular parts, structures, and components of the various exemplary embodiments may be interchanged freely without adding or detracting from the technology described herein. In the description of any particular exemplary embodiments, structure described elsewhere in present application may/may not be described with respect to the particular exemplary embodiment as a matter of convenience.

The present technology provide actuation systems to automatically retract and/or deploy panels of a rear aerodynamic structure of a cargo body. The actuation system can include actuators (e.g., air bags/muscles, pneumatic actuators, hydraulic actuators, gas springs, spring-loaded reels) which can deploy panels rearwardly away from a cargo body and/or retract the panel towards the cargo body. As used herein, actuators can be "passive" or "active." Passive actuators refer to actuators that use a biasing force to move the panels (e.g., spring-loaded cable, gas spring, spring-loaded hinges, mechanical spring). Active actuators refer to actuators that can counteract the biasing force to move the panels in the opposite direction of the passive actuators (e.g., a pneumatic actuator, hydraulic actuator, electric actuator, air bags/muscle).

In a preferred embodiment, the panels are deployed using passive actuators (e.g., gas spring mechanism) and retracted using active actuators (pneumatic actuator). But, in some embodiments, the panels are deployed using active actuators and retracted using passive actuators, while in other embodiments, a single active actuator (e.g., pneumatic, electric, hydraulic) could be used to both deploy and retract the panels since it could be driven under power in either direction (and pause somewhere in between). For example, a pneumatic force could be applied to either side of a piston by controlling valves with a solenoid controlled valve. The active actuators can be activated in response to receiving or detecting a signal indicating that the panels should be retracted (e.g., slower speed, location, vehicle movement is in a reverse direction, proximity to object).

In some embodiments, the actuators are attached to the rear of the cargo body (e.g., on the door) and directly to a panel of the aerodynamic structure. In other embodiments, the actuators are attached to the door and to a linkage assembly which is attached to one or more panels (i.e., the actuator is attached to the panels via a linkage assembly). The linkage assembly can allow for concurrent movement of panels.

While the embodiments described throughout the specification may specify a type of active or passive actuator, it is contemplated that a different type of active or passive actuator could be used.

FIG. 1 shows the rear door arrangement 100 of a cargo body 110 that can be a trailer body for a tractor trailer (truck) or other vehicle (e.g. a semi-trailer body, an intermodal container, a panel truck). The exemplary cargo body 110 includes a pair of swinging doors 120, 122 of conventional design that are mounted (e.g., via hinges 124) to the rear door frame 126 of the body 110. The doors can be secured in the depicted closed position using conventional lock rods 128 and when opened, fold nearly 270 degrees to lie against the sides 130 of the cargo body 110.

Side (also termed "lateral") and top aerodynamic panels 140 and 150, respectively, are shown mounted on the door 120. A similar arrangement is mounted on the opposing door 122, but is omitted for clarity. It is expressly contemplated that each door include a mirror image of the panel arrangement and that the two top panels (150) confront each other at the inner edge 152, which can include a resilient and/or brush seal to reduce air leakage into the cavity formed within the panel structure. The bottom end 160 of the panel arrangement is open and free of a bottom panel in this embodiment, thereby defining a "three-sided" aerodynamic structure. In alternate embodiments, a bottom panel can be provided to define a "four-sided" aerodynamic structure. The top panel 150 includes a diagonal hinge 154 that divides the panel 150 into two halves (an inner top panel 156 and outer top panel 158), that each fold inwardly (in the manner of an accordion fold) during panel retraction. The outer top panel 158 can be hingedly mounted to the top edge of the side panel at a mutual top corner 142. Thus, in some embodiments, the panels fold inwardly to lay against the door 120 in a coordinate manner with the two top panel halves 156, 158 stacked beneath the side (lateral) panel 140 in the retracted position.

The panels can be constructed from a variety of materials, such as a composite or polymer sheet that provides a resilient, yet rigid (i.e. semi-flexible), sheet material having an exemplary thickness of approximately 1/16 to 1/4 inch. Appropriate hinges 170 attach the panels 140, 150 to the door 120.

Note that is expressly contemplated that the arrangement of panels is illustrative of a wide range of deployable aerodynamic structures that can be actuated in accordance with the principles of the embodiments herein. Various examples of deployable panels are provided in the above-incorporated U.S. Pat. Nos. 8,100,461, 8,360,509, and related applications thereto. Further examples of deployable panels are described, by way of useful background information in commonly assigned U.S. Pat. No. 9,145,177, by Smith, et al., the teachings of which are also incorporated herein by reference in its entirety for all purposes. As described therein, deployment of panels can be controlled by existing on-board systems found in most modern trucks and cargo vehicles including the electronic control unit (ECU), antilock braking system (ABS), and various components of the pneumatic pressure system, including pumps, pressure storage tanks and control valves. The use of these systems/components in association with actuation of panels is described further below.

Figure 2:
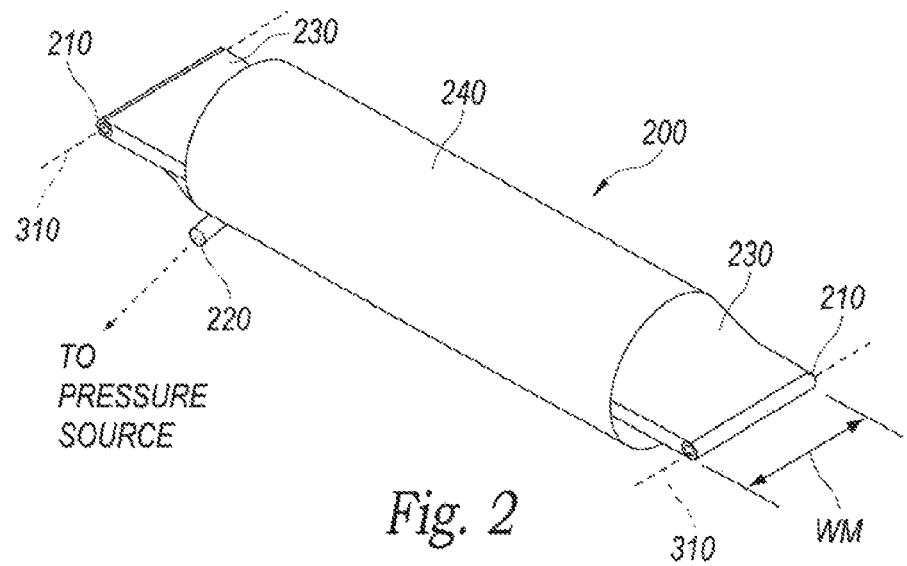
FIG. 2 is a perspective view of a fluid muscle for use with the arrangement of FIG. 1 shown in a pressurized, extended configuration.
Figure 3:
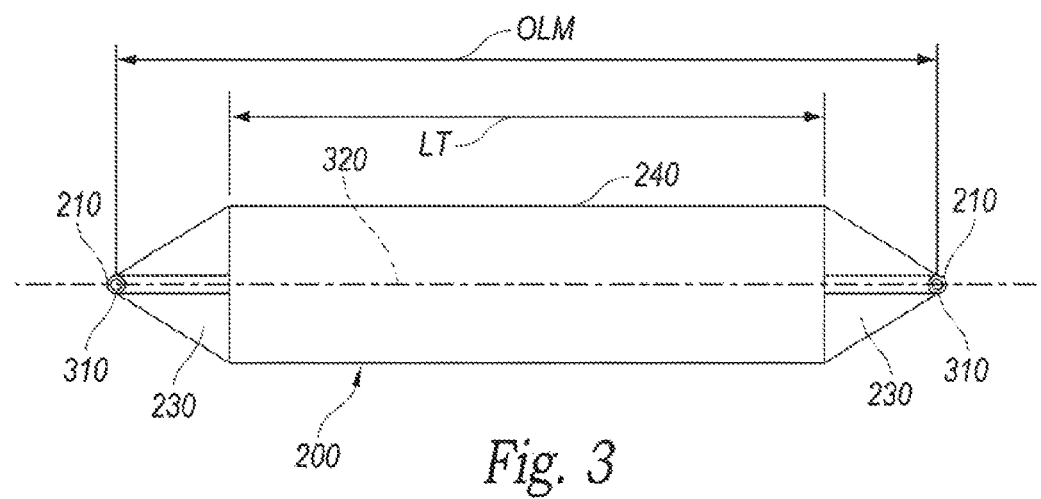
FIG. 3 is a side view of the fluid muscle of FIG. 2.
Figure 4:
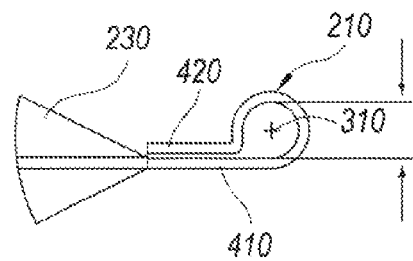
FIG. 4 is a fragmentary side view of a mounting loop for the fluid muscle of FIG. 2 for use in pivotally attaching the end of the muscle to a mounting location on either the panel or the door of FIG. 1.

With reference now also to FIGS. 2-4, the side and top panels 140 and 150 are each interconnected with a fluid muscle assembly 200 that extends between a mounting/pivot location 180 on the door 120 and an opposing mounting/pivot location 182 on each panel 140, 150 (and in particular on the inner top panel 156). The fluid muscle is a resilient tube constructed from an appropriate material (e.g., vinyl, synthetic or natural rubber, PVC), that can include fiber reinforcement for added strength and durability. The wall thickness of the material can vary based on strength and flexibility requirements, and can vary along the length of the muscle where more or less reinforcement is needed (e.g., thicker at the ends and thinner in the middle where it folds). For example, a wall thickness of approximately 1/16-3/16-inch can be used. In some embodiments, the muscle can include a mechanism 174, 184 (e.g., dump valve) to quickly release fluid.

The muscle 200 and its mounting arrangement to the door/panel are designed for ease of service and replacement. The muscle can have two opposing mounting loops or sleeves 210 with rotational axes 310 that are parallel to one another. One technique for constructing a loop 210 is shown by way of the non-limiting example depicted in FIG. 4. In FIG. 4, the material is folded into a loop 410 with a portion 420 overlapping and secured (e.g. by welding, adhesives, sewing, through-fasteners) to cargo door and/or a panel. The liner can be a metal liner and it can provide a journal bearing surface for a clevis pin (e.g., a bolt and opposing nut or cotter pin/clip). This bolt or other clevis pin passes through holes on a clevis. This clevis structure is shown with reference to FIGS. 5-7, in a U-shaped member with two raised tabs 510 having holes 512 to capture the clevis pin on either side of the muscle. The clevis can be mounted to the door using fasteners at the location 180, and to the panel at the location 182. A variety of alternate structures can be used to secure each end of the muscle at its mounting location—for example, a hinge can be used or the muscle end can include a living hinge in its flexible material that is fastened directly to the door/panel.

The tubular structure of the muscle 200 is sealed except for one or more fluid inlet/outlet(s) 220 that can be located at any position along the body of the tube. This inlet/outlet is operatively connected with a pressure source on the vehicle as described below. The loops 210 are located at opposing tapered ends 230 molded unitarily (or integrally joined) as part of the overall structure. These tapered ends provide swing clearance for the muscle during deployment and retraction of panels 140, 150 and center each loop 210 and axis 310 along the centerline (center plane) 320 of the muscle 200.

The dimensions of the muscle 200 are highly variable depending upon its mounting location(s) and the size/shape of the panels. In an embodiment, the overall length OLM of the muscle between axes 310 is approximately 36 inches. In some embodiments, the length LT of the central tubular portion between tapered ends 230 is approximately 24 inches. In some embodiments, the width WT of the muscle and diameter where the cross section is circular can be approximately 6 inches. These dimensions are only illustrative of a wide range of possible measurements. Likewise, the cross section shape of the illustrative muscle tubular section 240 shown in FIG. 2 is circular thereby defining a regular cylinder. However, the shape of the muscle can be can be ovular, rectangular polygonal, or other regular or irregular shapes. For example, the cross section shape of the muscle along its length can vary (e.g., more circular at the ends and more flattened in the middle) to facilitate folding as described below.

Figure 5:
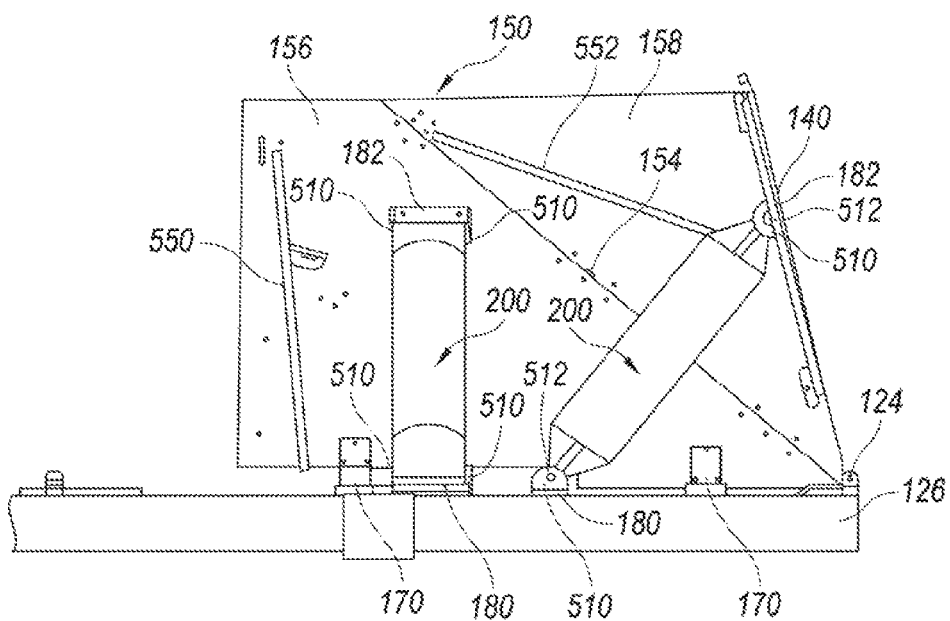
FIG. 5 is a fragmentary bottom view of the swinging rear door arrangement of FIG. 1 with panels shown in a deployed position.
Figure 6:
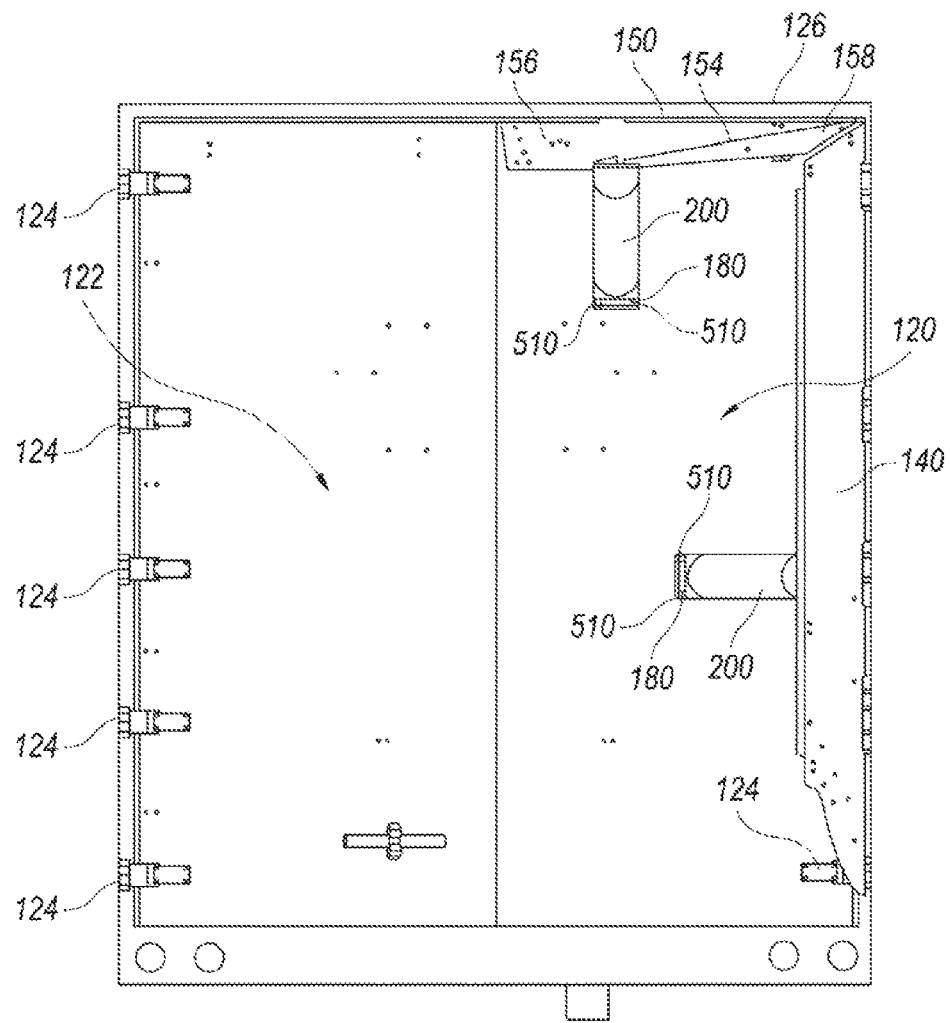
FIG. 6 is a rear view of the swinging rear door arrangement of FIG. 1 with panels shown in a deployed position.

As shown in FIGS. 5-6, the muscles 200 for each panel 140, 150 have been pressurized to deploy the panels to their maximum extension, at which they define an inward/rearward taper as shown to achieve a desired aerodynamic affect. Illustratively, the taper can be between approximately 4 and 20 degrees relative to the plane of the cargo body. In some embodiments, particularly where the top panels 156, 158 are semi-rigid, the top panels 156, 158 can include reinforcing bars 550, 552 (e.g., angle brackets) on their interior surfaces to assist in maintaining a planar shape under aerodynamic loads. One or more similar bars can be located on the inner face of the side panel 140 to provide appropriate reinforcement. Referring also to FIG. 1, extension of one or more of the panels 140, 150 can be retarded by a cable 196 that is attached between the panel(s) and the door 120. The cable collapses when the panels are retracted and becomes taut when the panels are fully deployed.

Figure 7:
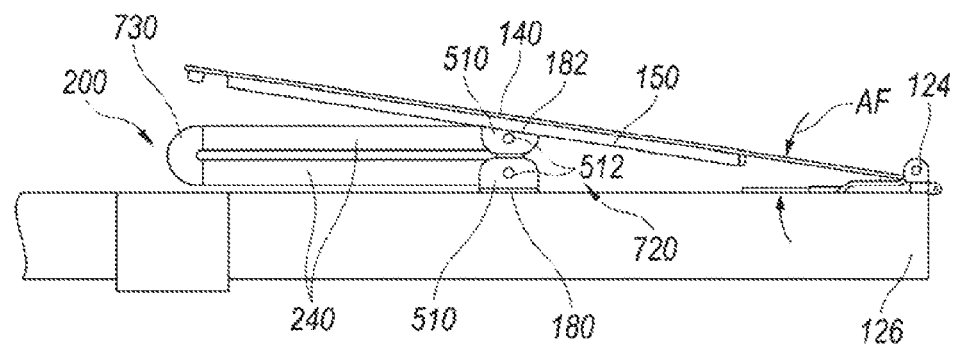
FIG. 7 is a fragmentary bottom view of the swinging rear door arrangement of FIG. 1 with panels shown in a retracted position.
Figure 8:
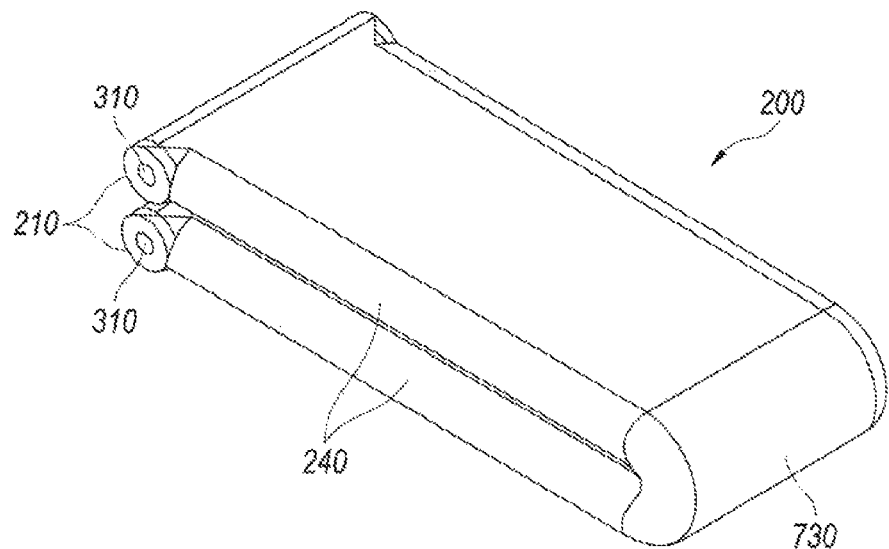
FIG. 8 is a perspective view of the fluid muscle for use with the arrangement of FIG. 1 shown in a depressurized, folded/flattened configuration as shown in FIG. 7.
Figure 9:
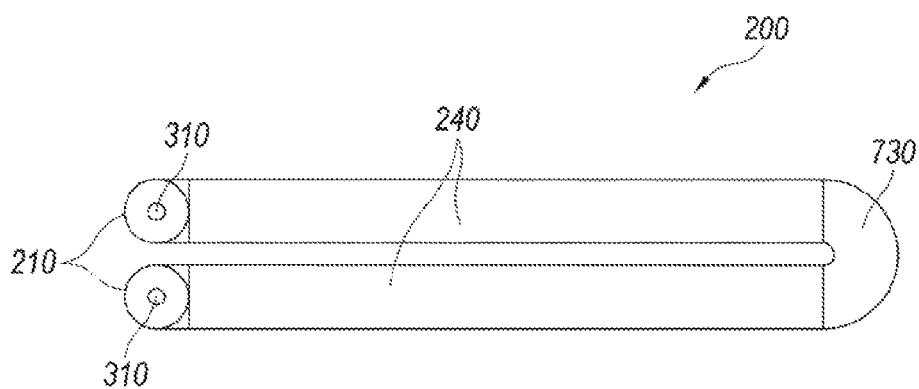
FIG. 9 is a side view of the folded/flattened fluid muscle as shown in FIG. 8.

With reference to FIGS. 7-9, the arrangement is shown in retracted position in which the muscles 200 attain a flattened and folded-over shape that allows the panels 140, 150 to lay against the door 120 in a stacked configuration. As described in the above-incorporated patent applications, the retracted panel arrangement is configured to reside at an angle AF with respect to the plane of the door 120, as shown in FIG. 7. This allows a space 720 for the folded-over muscle 720 and mounting arrangement (devises). As described above, the folded mid-section 730 of the tubular structure 240 in each muscle 200 can be constructed with a differing geometry, thickness and/or material so as to facilitate a fold as shown. Alternatively, the muscle can normally fold at this location without (free-of) any local alteration to the cross-sectional geometry. As shown, the resulting folded shape defines a compact arrangement that fits within the space 720 defined by the fold angle AF.

Figure 10:
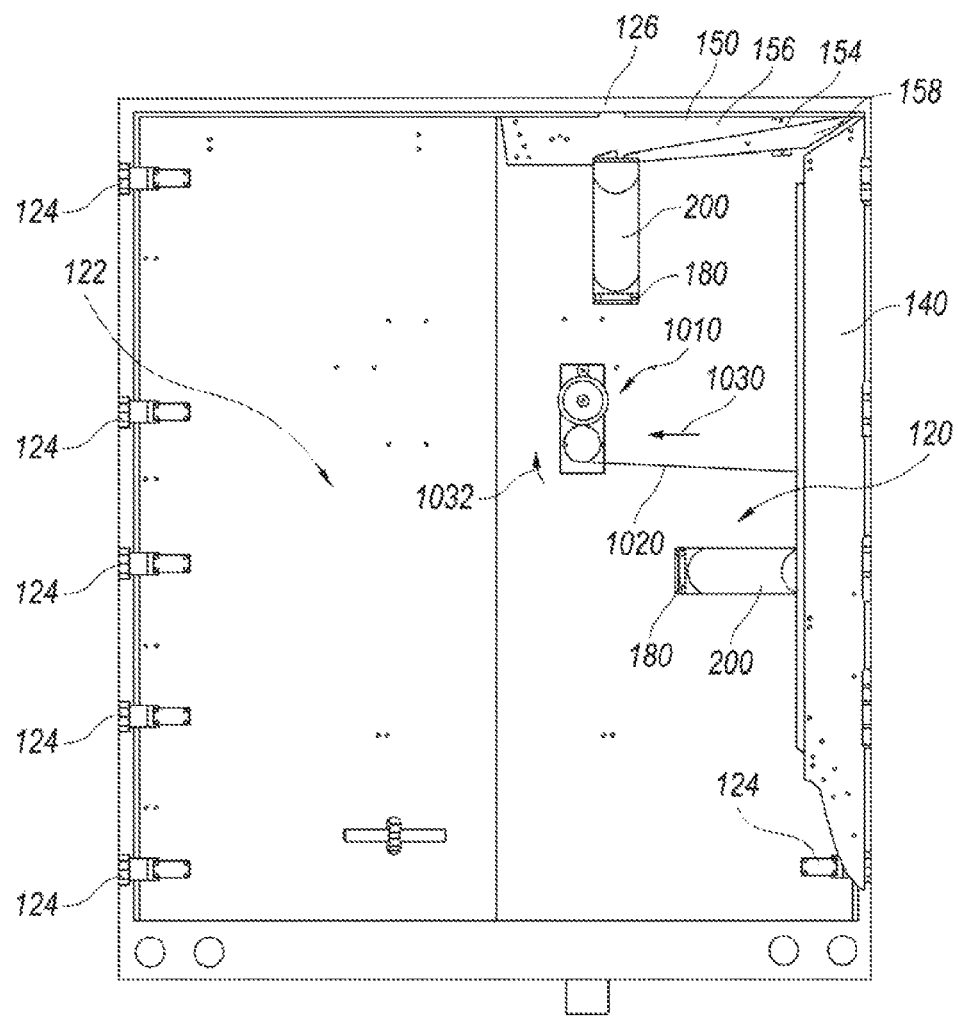
FIG. 10 is a rear view of a swinging rear door arrangement employing a spring-loaded cable and reel as a return system for use in, for example, the embodiment of FIG. 1.

While not shown in this embodiment, retraction and folding of the aerodynamic structure is facilitated by a return mechanism that biases the panels into a retracted position, and that is overcome by the extension force of the muscle when pressurized. By way of non-limiting example, as shown in FIG. 10, the door includes a surface-mounted, recessed, or interior-mounted) spring-loaded reel or winch assembly 1010 that biases a cable 1020 attached to the side panel 140 into a retracted position as depicted by arrow 1030 based on spring-loaded rotation (curved arrow 1032) of the assembly 1010. In some embodiments, the spring force is sufficient to retract the panels as the muscles are depressurized, but can be overcome by the biasing force of the muscles when pressurized. Because the panels 140, 150 are tied together via hinges, biasing the side panel facilitates retraction of the entire arrangement. Alternatively, or additionally, a biasing cable can be tied to the top panel 150. The reel/winch can define a constant-force, ratcheting unit that can be electrically latched (described below) and otherwise ratchet to selectively resist motion in one or both directions.

While a cable assembly is used as a return mechanism in this embodiment, it is expressly contemplated that an alternate mechanism can be used to bias the panels into the folded/retracted position. For example, spring-loaded hinges or a gas or mechanical tension spring located between the door and panel(s) can be used instead of a cable assembly to bias the panels into the retracted position. Likewise, the spring mechanism can be integrated externally or internally in the muscle(s) so that the arrangement is free of separate return mechanisms (for example, a leaf spring or spring loaded hinge at the fold location 730 of the muscle). Also, while a spring-loaded reel assembly is used in this embodiment, it is expressly contemplated that an alternate power source can be employed to bias the return mechanism of this or other embodiments (e.g., an electric rotary motor, an electric linear motor, a linear or rotary fluid actuator). In some embodiments, the air bag can be designed with an inner chamber to provide a pulling motion instead of a pushing motion. For example, the air bag could pull a cable that is connected to a linkage. Alternatively, the pushing motion could be used to retract the aerodynamic structure, so that the air bag could be constrained to the door (e.g., via cables, track). In such embodiments, when the air bag expands, the air bag can pull a cable that is connected to a linkage or panel.

Figure 11:
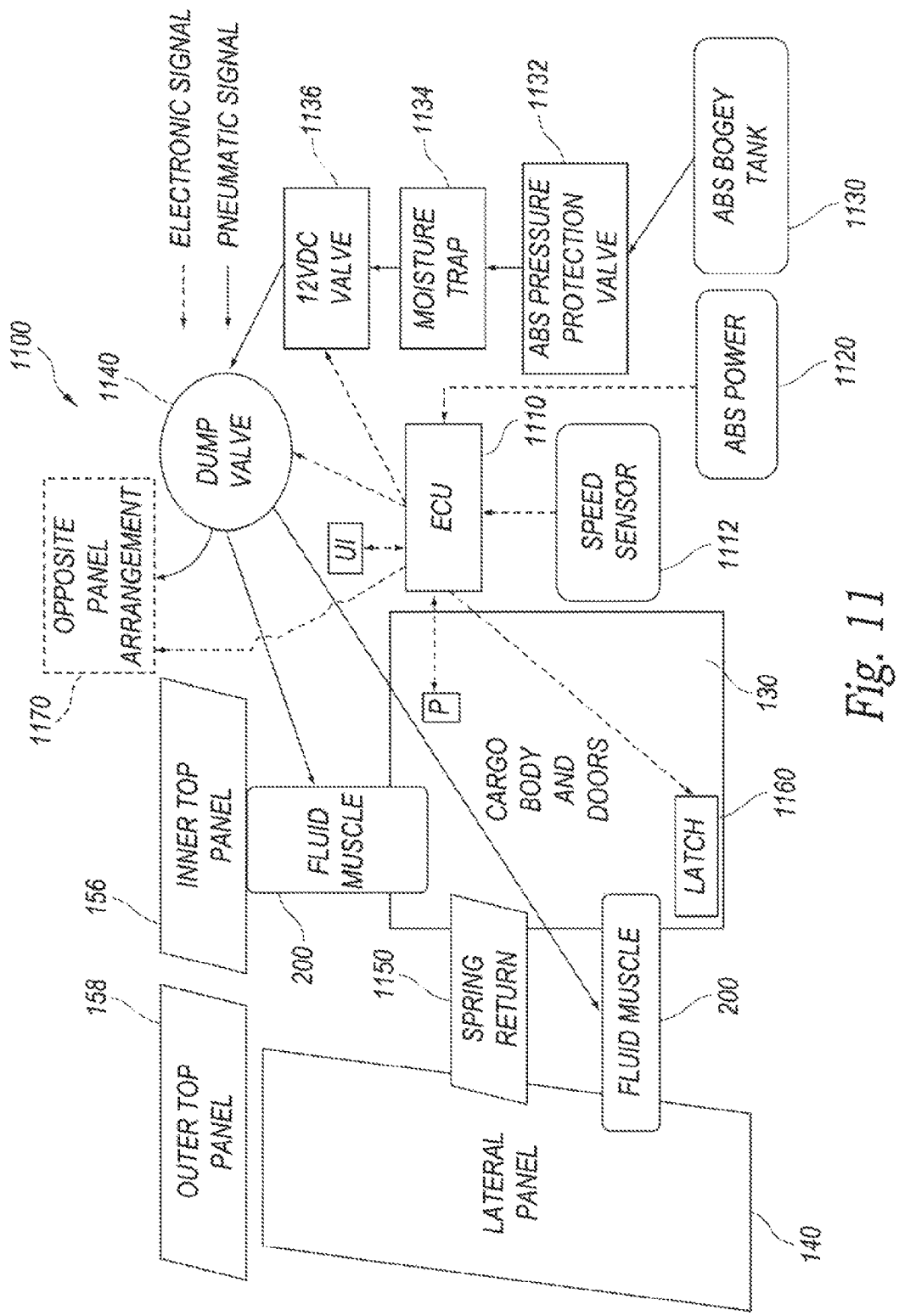
FIG. 11 is a block diagram of a system for controlling and pressurizing a plurality of fluid muscles used in the arrangement of FIG. 1.
Figure 13:
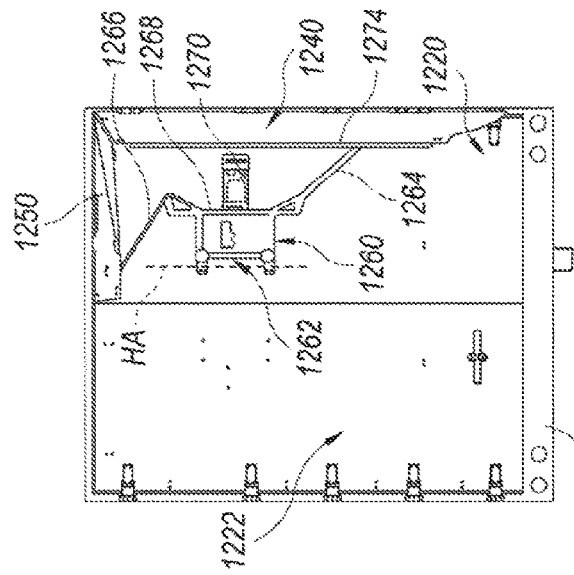
FIG. 13 is a rear view of the swinging rear door arrangement of FIG. 12 with panels shown in a deployed position.
Figure 15:
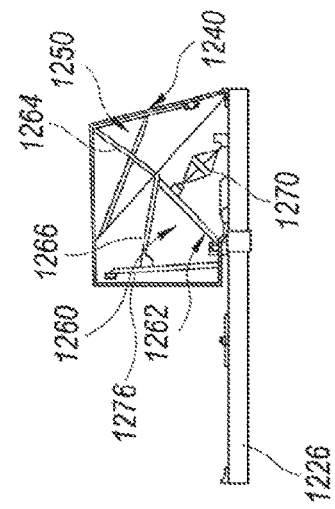
FIG. 15 is a bottom view of the swinging rear door arrangement of FIG. 12 with panels shown in a deployed position.
Figure 12:
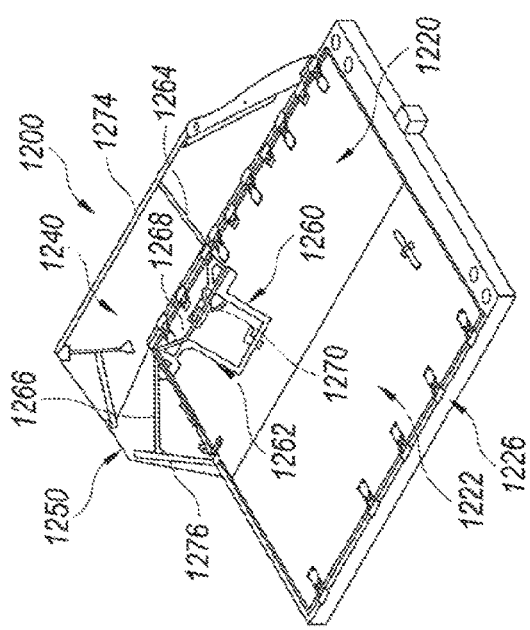
FIG. 12 is a perspective view of a swinging rear door arrangement on a vehicle (e.g., truck trailer) cargo body, including an aerodynamic panel assembly for one door, which uses fluid muscles to deploy the panels via a swing-arm assembly, according to an alternate embodiment, with panels shown in a deployed position.
Figure 14:
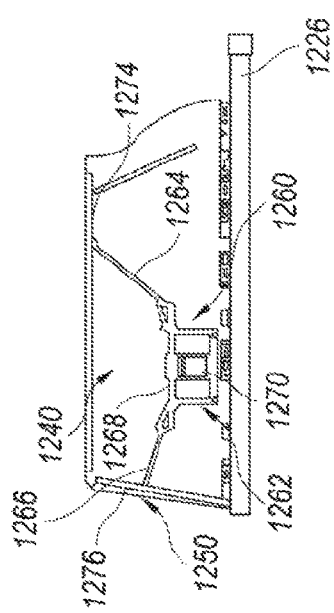
FIG. 14 is a side view of the swinging rear door arrangement of FIG. 12 with panels shown in a deployed position.

As described above, the muscle(s) can be pressurized and depressurized by a variety of control arrangements that can be powered separately from, or integrated with, the vehicle's control and pressure system(s). Reference is made to FIG. 11, which shows an illustrative control and pressure arrangement 1100. In the embodiment depicted in FIG. 11, the system is controlled by the existing vehicle electronic control unit ("ECU") 1110 and responds to a predetermined vehicle speed reported by the speed sensor 1112 to deploy or retract the panels—that is, when a predetermined speed (e.g., 30-40 mph) is attained, the system deploys the panels and when the speed drops below a threshold (e.g., 30-40 mph), the panels are retracted. The deploy and retract speeds may be the same. In certain embodiments, the speed at which the system deploys may be set higher than the speed at which the system retracts to avoid cycling the devices as speed varies about one or the other set point. The automated feature also may have a time at speed determination to avoid deploying the panels for short acceleration or retracting the panels for short deceleration or traffic stops. Illustratively, the system can require that the speed be maintained for a certain time (e.g., one minute) before the configuration changes between retracted to deployed. The ECU 1110 is powered by the ABS system 1120 in this embodiment. An air pump provides pressure to the bogey tank 1130 on the cargo body 130.

The system includes a conventional protection valve 1132, moisture trap 1134 and electrically controlled valve 1136, actuated selectively by the ECU 1110 to pressurize the muscles 200. Pressure from the valve 1136 is routed to a dump valve 1140 that is also operatively connected to the ECU 1110. The dump valve 1140 directs fluid (e.g., air) to the muscles 200 during pressurization/deployment and vents fluid in the muscles 200 to the environment during depressurization/retraction. The dump valve 1140 also maintains the pressure within the system while the muscles are extended and the panels 140, 150 are deployed. Note that this is one technique for providing inflation pressure to the muscles. In alternate embodiments described below, one or more electrically operated (e.g., low-pressure, high-volume) inflators can fill muscles and valves can be integrated with each muscle or with the inflator itself.

As described above, an appropriate return mechanism (e.g., spring-loaded) 1150 biases the panel(s) 140, 150 into the retracted position when the muscles 200 are depressurized by the dump valve 1140. The biasing force of the return mechanism 1150 can assist in deflating the muscles as they fold under the force of the return. The arrangement can also include a latch assembly (e.g., a solenoid-operated pin) 1160 that selectively locks the panels in a deployed and/or retracted position. Note that the latch 1160 can interact with, for example, the panel hinge assembly, the return mechanism 1150 (for example, locking a gas or mechanical spring) or another member in the arrangement to secure the panels in a desired position/configuration. It is also expressly contemplated that the valves, latch and other structures in the system 1100 can be adapted to secure the panels 140, 150 in intermediate positions between a maximum deployed and a fully retracted position so that the panels are provided with an adjustable taper. A position sensor P interacts with the ECU to partially pressurize the muscles 200, so as to achieve an intermediate deployment of the panels 140, 150. This position sensor P can also provide information to the ECU indicating whether the panels are fully deployed or fully retracted.

Note that the illustrative ECU 1110 and/or its functions can be substituted with an alternate vehicle control system or a purpose built control circuit/processor. Also, the vehicle cab can be provided with various indicators, displays and control interfaces (UI) that allow the driver to manually deploy or retract the panels and monitor their current status. Also, as described above, it is expressly contemplated that the system 1100 operatively interconnects to the opposing door panel arrangement 1170 (shown as a functional block, in phantom) in a similar manner to perform a similar function. While not required, both sides are typically deployed and retracted concurrently by the system 1100.

Reference is now made to FIGS. 12-15, which show an alternate arrangement 1200 for a deployable aerodynamic structure on the rear doors 1220, 1222 of a cargo body 1226. In the embodiment shown in FIGS. 12-15, the top and side panels 1240 and 1250 are hingedly mounted to the door 1220 similarly to how panels 140, 150 are mounted to the door 120 described above. In this embodiment, as described in the above-incorporated patent applications, a swingarm assembly 1260 includes a frame 1262 that is hingedly mounted or otherwise attached at one end to the door (with hinge axis HA generally vertical). The opposing (far) end 1268 of the frame 1262 includes two extension rods 1264 and 1266 that pivotally attach, respectively, to associated reinforcing bars 1274 and 1276 on each panel 1240 and 1250, respectively. The ends of the extension rod 1264, 1266 are pivotally attached to the respective bars 1274, 1276. The opposing attachment points for the rods 1264, 1266 can define ball joints so as to allow rotation in multiple degrees of freedom. Alternatively, a gimbal system can be used at one or both ends. The swingarm assembly 1260, thus coordinates concurrent deployment (unfolding) and retraction (folding) of the panels 1240, 1250. In a retracted position, swingarm assembly 1260 folds into the above-described space between the door and stacked panels. In certain embodiments, the swingarm assembly 1260 may be replaced by a linkage coupling the door and the top panel such that the movement of the linkage causes the top panel to move between the retracted and deployed positions. The fact that the top panel is coupled to the side panel further causes the side panel to move between the retracted and deployed positions. Alternatively, the linkage may be coupled between the door and the side panel to the same effect. In still other embodiments, the linkage may be between the outer top panel and the side panel.

A single muscle 1270 of appropriate size and shape can be pivotally mounted between the door 1220 and far end 1268 of the swingarm frame 1262 at an angle that allows the swingarm to rotate the frame 1260 outwardly (away from the door 1220) upon pressurization. The swingarm folds inwardly toward the door when the muscle 1270 is depressurized. An appropriate return mechanism (e.g. a gas spring, compression spring, spring-loaded hinges, cable reel, etc.) can be attached to either the swingarm assembly, the panel (s) or both to retract the arrangement when the muscle 1270 is depressurized. Control of the muscle (on each door panel arrangement) can be implemented in the manner described in FIG. 11 above.

With reference again to FIG. 1, the placement of pressure lines, valves and other system components is variable and such components can be mounted on the body or integrated into its components. Lines can be routed optionally through the rigid panels of the arrangement or the cargo body to which they are attached, and connected optionally through quick-disconnect or permanently adhered connections to the muscles 200. The lines are typically, but not required to be, appropriate for low-pressure, high-flow-rate airflow regimes (e.g., sufficient diameter to allow a simple fan to inflate the system). Tubing is generally used, although a similar function could be accomplished in other ways such as by having each muscle inflated with its own inflator system, in which case an electrical lead is provided from the controller to operate each muscle's inflator. As shown in FIG. 1, a pressure unit (e.g., a main valve block and/or inflator 190 is located under the body 130), and is joined to pressure lines 192 that can also include electrical leads to valves (e.g., dump valves) 194 on each muscle 200.

Additional/optional functional and structural considerations with respect to the illustrative aerodynamic arrangement are now described. In general, the muscles are desirably operated at low pressure (e.g., approximately 5-30 psi) to avoid complications and potential safety issues. The muscles can define any appropriate shape and/or length required by the desired geometry of the folding arrangement. In general, such muscles are approximately tubular and several feet long in illustrative embodiments, with provisions at the end to mount with a clevis pin (bolt) as a hinge to pivotally attach between the arrangements rigid/semi-rigid panels and the structure of the cargo body. Unlike prior systems using mechanical, electrical, or passive airflow systems to deploy rigid panels, and which are often disadvantageous due to power requirements, expense, complication, number of parts, and difficulty of controlling the mechanism, the illustrative embodiments use low-pressure muscles (bladders) that are straightforward and inexpensive to manufacture, use inexpensive control systems, and avoid use of high power to deploy or retract. These muscles do not require excessive amounts of inflation air. Additionally, due to their surface area, the muscles are not overly susceptible to leakage, which reduces pressurization/depressurization time and required wall thickness, and allows for easier and safer stowage when folded.

Illustratively, the arrangement can use one or more valves that provide, for example, one way inflation, over-pressure release during impact, release of pressure to intentionally close the system, transfer of air to other muscles that provide some other function such as stiffening or closure of the system, limit the amount of air that a compressor provides (e.g. in the event of a leak or the failure of a cutoff switch), and/or one-way inflation of muscles for the closure of the system. The system does not require such valves to operate, though they may be useful. Similar functions can be accomplished by using the pump itself as a valve, for example, in accordance with known pressure-handling principles.

An inflation system for the muscles can be any type of compressor, storage tank or fan. Illustratively, the inflator operates at the vehicle battery/alternator voltage (e.g., 12 V) or at an alternate voltage used by the vehicle (e.g., 24 V, 32 V) and low amperage (e.g., 1 A) so that it does not adversely affect the vehicle electrical system and safety systems, In various embodiments, a low-flow-rate/low-pressure inflation system can be used. Moreover, the system can be adapted to scavenge air from the free airflow around the vehicle, from vehicle tire inflation systems, from the trailer air brake system, or from other parts of the fluid-muscle-actuated aerodynamic system, to provide inflation for the actuator muscles.

Generally, it is contemplated that the arrangement employs an electronic control system that can operate the appropriate valves and inflators to position the panels in the desired position (i.e., retracted, fully deployed, partially deployed) according to vehicle speed or position. For example, when the vehicle is travelling at 35 mph and/or accelerating for a given time period, an electrical signal from an appropriate sensor, or other electronic system, causes the arrangement's ECU to open the fill valves, turn on the inflator, and release any latches, causing the panels to deploy. The reverse process can occur when the vehicle decelerates below 35 mph (or other low-threshold speed) for a given time duration, allowing the system to stow the panels at continuing low speeds. This process can be accomplished digitally with a microcontroller and associated analog-to-digital converters, or by an analog electronic system using appropriate relays that should be clear to those of ordinary skill in the art. Additionally, the deployment/retraction of panels can illustratively function without (free-of) any ECU by relying on physical signals and conditions present while the vehicle is in motion or stopped. For example, the free air flow around the vehicle can be used to inflate the muscles via an air scoop on the body that is routed to the muscles, while deceleration can release valves and allow the muscles to deflate and fold under the assistance of momentum and gravity.

Optionally, latches controlled via mechanical, electronic, and/or air-pressure mechanisms can hold the device stable when open or closed (e.g., a low-air-pressure or electronic switch that is released when the system begins to deploy). Such latches could also keep the panels open. It is contemplated, however, that in various embodiments the muscles themselves can accomplish this function. The arrangement can also include devices that are sensitive to physical external conditions, such as impact by a foreign object, acceleration or deceleration, gravity, and wind speed.

It is also expressly contemplated that, while the illustrative embodiments show the use of fluid muscles (air bladders that are extended with relatively low pressure) to deploy a folding arrangement or rigid/semi-rigid panels, it is expressly contemplated that one or more muscles and an appropriate control system can be used for other vehicle systems that use movable rigid/semi-rigid panels on portions of the vehicle body, typically in conjunction with a hinge assembly between the body and the panel. Thus, muscles can be used to deploy and/or adjust underbody skirts. Retractable/adjustable skirts and/or aprons, spoilers on a trailer or tractor, and other vehicle-mounted mechanisms requiring deployment and retraction. In general, low-pressure bladders can also be used to support aerodynamic surfaces that are mainly static, and affixed to other areas of the trailer.

Figure 16:
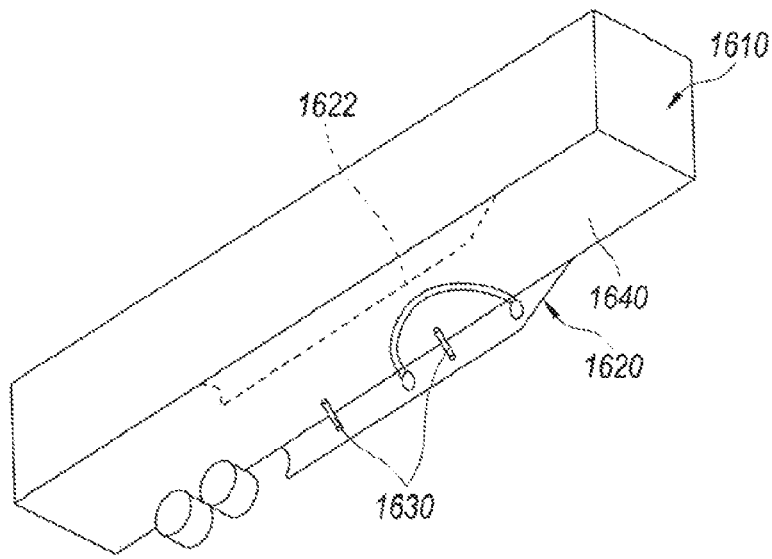
FIG. 16 is a perspective view of an exemplary cargo body comprising a trailer with an aerodynamic skirt arrangement having fluid muscles to provide rigidity and to collapse/absorb shock according to an illustrative embodiment.
Figure 17:
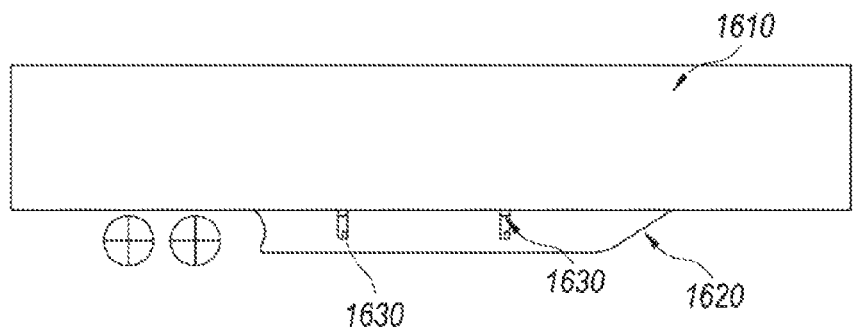
FIG. 17 is a side view of the exemplary cargo body and aerodynamic skirt arrangement of FIG. 16.
Figure 18:
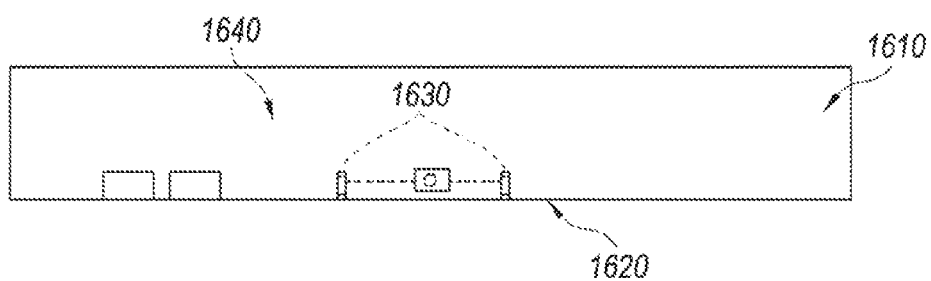
FIG. 18 is a bottom view of the exemplary cargo body and aerodynamic skirt arrangement of FIG. 16.

By way of further example, and with reference to FIGS. 16-18, an exemplary cargo body 1610 is shown, including an aerodynamic skirt arrangement 1620 according to an embodiment. The depicted embodiment details one side of the skirt arrangement for clarity. It is contemplated that a similar, mirror image skirt (shown in phantom as skirt 1622) is provided along the opposing side of the body 1610 in an illustrative embodiment. In this embodiment, the skirt 1620 is illustratively supported with a bladder/fluid muscle system that provides an amount of compliance and deformability that allows such skirts to survive impacts that are common, yet rigidly support the surface so that it performs its aerodynamic function. In this embodiment, the bladders 1630 are air-filled by an (integral) inflation system as described above, or by an external system in the manner of a permanently inflated tire. Dump valves can be used to release air pressure in the event of a large impact. In this embodiment, each skirt 1620 (and 1622) is mounted to the bottom of the body 1610 by a hinge arrangement (e.g., mechanical hinges, living hinges) of conventional or custom design. The skirt is biased into the depicted deployed position by two bladders 1630 in this example. In alternate embodiments, a greater or smaller number of bladders can be employed. The bladders are each pivotally mounted adjacent to a lower edge of the skirt 1620 (and 1622) and to a position along the underside 1640 of the body 1610. This defines a truss arrangement that provides strength and stability to the deployed skirt. In some embodiments, the skirt can be arranged to deploy from a retracted position based upon inflation of the bladders 1630 and an appropriate return (e.g., spring) mechanism.

It is expressly contemplated that the depicted skirt arrangement can be adapted to other rigid panels on the vehicle which can benefit from shock absorption, and optionally, from retraction and deployment—for example, a top aerodynamic spoiler.

Figure 19:
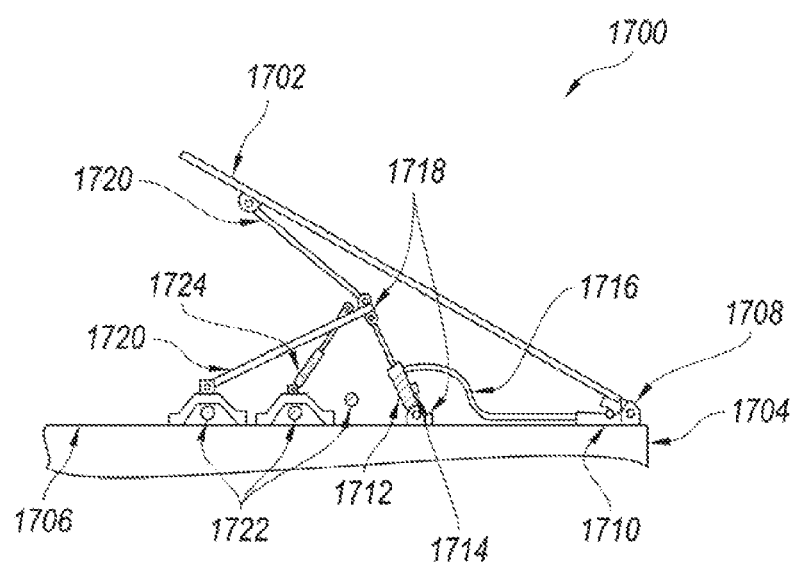
FIG. 19 is a top view of an aerodynamic structure which uses an actuator to deploy and/or retract the panel according to an illustrative embodiment, with the panel shown in a partially deployed position.

FIG. 19 is a top view of an aerodynamic structure. The aerodynamic structure 1700 includes at least one panel 1702, device hinge 1710, active actuator 1712, passive actuator 1724, and linkage 1720. Panel 1702 is coupled to the rear of a cargo body using device hinge 1710. Panel 1702 has both a deployed position in which panel 1702 is positioned away from the door 1706 of the cargo body (i.e., the position depicted in FIG. 19 shows the door 1706 partially deployed) and a retracted position in which panel 1702 is positioned closer to or against door 1706. Panel 1702 also can be partially closed, which may occur if an active actuator is not able to completely overcome a biasing force. The partially closed position may provide a favorable crash position as compared to the fully deployed position. That is, should the cargo body contact an object in the rear, the aerodynamic structure is more likely to collapse into a retracted position without damaging the panels or an adjacent building wall or dock door while in a partially closed position than in a fully deployed position.

Panel 1702 can be biased into the deployed position using passive actuator (e.g., gas spring) 1724. At a first end, passive actuator 1724 can be coupled to the rear of a cargo body using, for example, ball joints or hinges at pivot points mounted directly to door 1706 or above lock rods 1722. Mounting the passive actuator above lock rods 1722 allows the trailer doors to be rotated around to the sides of the trailers with little to no extra stack-up. At a second end, passive actuator 1724 is coupled to linkage 1720. In other embodiments, passive actuator 1724 is coupled directly to panel 1702.

Linkage 1720 can couple passive actuator 1724 to one or more panels, allowing for concurrent movement of panels. Linkage 1720 may further be attached to door 1706 (e.g., above lock rods 1722). For example, device linkage 1720 can be coupled to a side panel and a top panel (e.g., using cables, pulleys), and, as a result, the side panel and the top panel move concurrently. In another example, device linkage 1720 can be coupled to a bottom panel and a top panel, causing the bottom panel and the top panel to move concurrently. In a further embodiment, a side panel can be coupled to the bottom panel and/or the top panel so that the side panel and top and/or bottom panels move in concert. The linkage 1720 should be considered broadly to include a mechanical connection between two objects capable of transmitting mechanical force in a direction. Exemplary linkages may include simple tie rods or cables. In some embodiments, the panels are coupled together to further provide concurrent movement. Device linkage 1720 can include one or more rotating hinges or ball joints 1718.

Panel 1702 can be moved from the deployed position to the partially retracted or retracted position using active actuator 1712. At a first end, active actuator 1712 can be coupled to door 1706, and, at a second end, active actuator 1712 can be coupled to a linkage 1720. In other embodiments, active actuator 1712 is coupled directly to panel 1720. As with passive actuator 1724, linkage 1720 can couple active actuator 1712 to one or more panels, allowing for concurrent movement of panels.

To retract panel 1702, air can be forced into actuator 1712 via airline 1716. As actuator 1712 is retracted, any air in actuator 1712 on the opposite side of the piston is forced into reservoir 1714 (or alternatively exhausted to the atmosphere via a valve, or compressed within the actuator). The air pressure pumped into actuator 1712 would pull the rod and draw panel 1720 towards the door overcoming the force of the passive actuator 1724. Reservoir 1714 can be fully contained so that the system is not exposed to debris and moisture. In other embodiments, reservoir 1714 can be in a vacuum state when panel 1702 is deployed and assist in retraction when signaled. In a further alternative embodiment, filtered fittings or valves could be used to exhaust and draw ambient air into active actuator 1712. The active and passive actuators could be reverses such that the passive actuator 1724 maintains the panel 1702 in a retracted position and air pumped into active actuator 1712 would force the rod outward pushing the panel 1702 into the deployed position overcoming the force of the passive actuator.

Door 1706 of the cargo body can be secured in the depicted closed position using lock rods 1722, and, when opened, the door, including the panel assembly, can fold using door hinge 1708 nearly 270 degrees to lie against the side 1704 of the cargo body. Thus, in some embodiments, panel 1702 is in contact or nearly in contact with the side 1704 of the cargo body when door 1706 is swung open. In such embodiments, a frame mounted pivot joint can be used to allow air line 1716 to rotate with door 1706. In other embodiments, air line 1716 can include an abrasion resistant cover.

In some embodiments, one or more intermediate linkages could be included between the active actuator and a main linkage. Additional linkages can provide flexibility in mounting locations to avoid packaging constraints. Additionally, such intermediate linkages could allow a lower force active actuator to be used to move the main linkage. For example, an intermediate linkage could include an active actuator mounted on the trailer door that is configured to move in a direction perpendicular to the ground (i.e., vertically). The moving end of the active actuator can be coupled with the main linkage using a cable and pulley linkage. The cable and pulley linkage can convert the travel of the active actuator from a vertical direction into a direction with a component that is perpendicular to the trailer door, which can be used to deploy or retract the panels.

Figure 20:
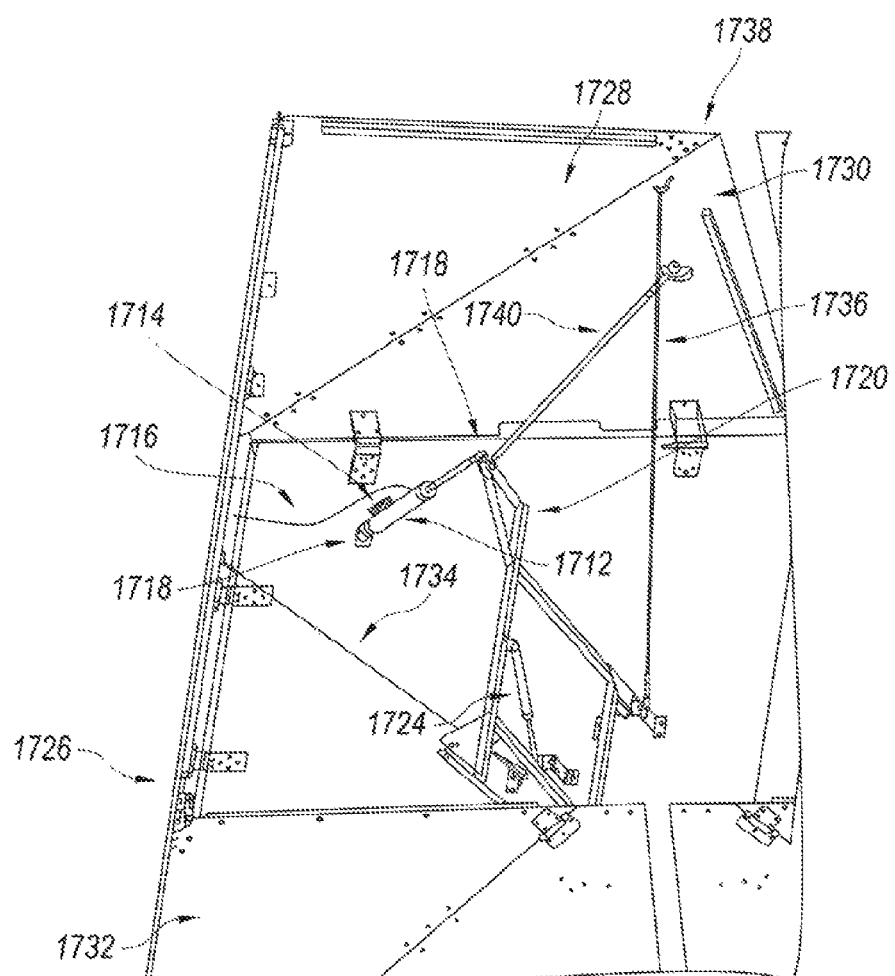
FIG. 20 is a tilted bottom view of an aerodynamic structure, which uses an actuator to deploy and/or retract the panels according to an illustrative embodiment, with the panels shown in a deployed position.

FIG. 20 is a bottom view of an aerodynamic structure, which uses an actuator (or actuators) to deploy and/or retract the panels. In FIG. 20, only an aerodynamic structure on the left side of a rear of a cargo body is shown. A similar structure can be used on the right side of the cargo body. The aerodynamic structure shown in FIG. 20 includes bottom panel assembly 1732, side panel 1726, top panel assembly 1738, active actuator 1712, passive actuator 1724, air line 1716, and device linkage 1720. Bottom panel 1732, top panel assembly 1738, and side panel 1726 are shown in a deployed position.

Linkage 1720 is coupled to passive actuator 1724 and active actuator 1712, as well as bottom panel 1732, top panel assembly 1738, and side panel 1726, allowing for concurrent deployment and retraction of the panels. Linkage 1720 is coupled to an inner top panel 1730 of top panel assembly 1738 via tie rod 1740 and cable 1736. Linkage 1720 is further coupled to side panel 1726 via cable 1734. Although not fully shown in this view, linkage 1720 can be further coupled to bottom panel assembly 1732. In some embodiments, an edge of outer top panel 1728 is attached along an edge of side panel 1726, and, similarly, an outer bottom panel can be attached along an edge to side panel 1726 to further assist the concurrent deployment and retraction of the panels.

Passive actuator 1724 (e.g., gas spring mechanism) can be attached to a door of the cargo body on one end and linkage 1720 via ball joints 1718 on the opposite end. Passive actuator 1724 can bias the panels into the deployed position by pushing on linkage 1720. Active actuator 1712 (e.g., pneumatic actuator) can be attached to the door of the cargo body on one end and linkage 1720 (e.g., via ball joints) on the opposite end. Active actuator 1712 can overcome the biasing force and move the panels to the retracted position by pulling on linkage 1720. While a variety of mounting locations for active actuator 1712 are available to retract the panels, the one illustrated in FIG. 20 is particularly appealing because active actuator 1712 rotates as it retracts in such a way to avoid any interference with secondary lock rods that are present on some cargo body doors. Active actuator 1712 can include reservoir 1714 to collect the air compressed by active actuator 1712. An air line 1716 can be coupled to active actuator 1712.

Figure 21:
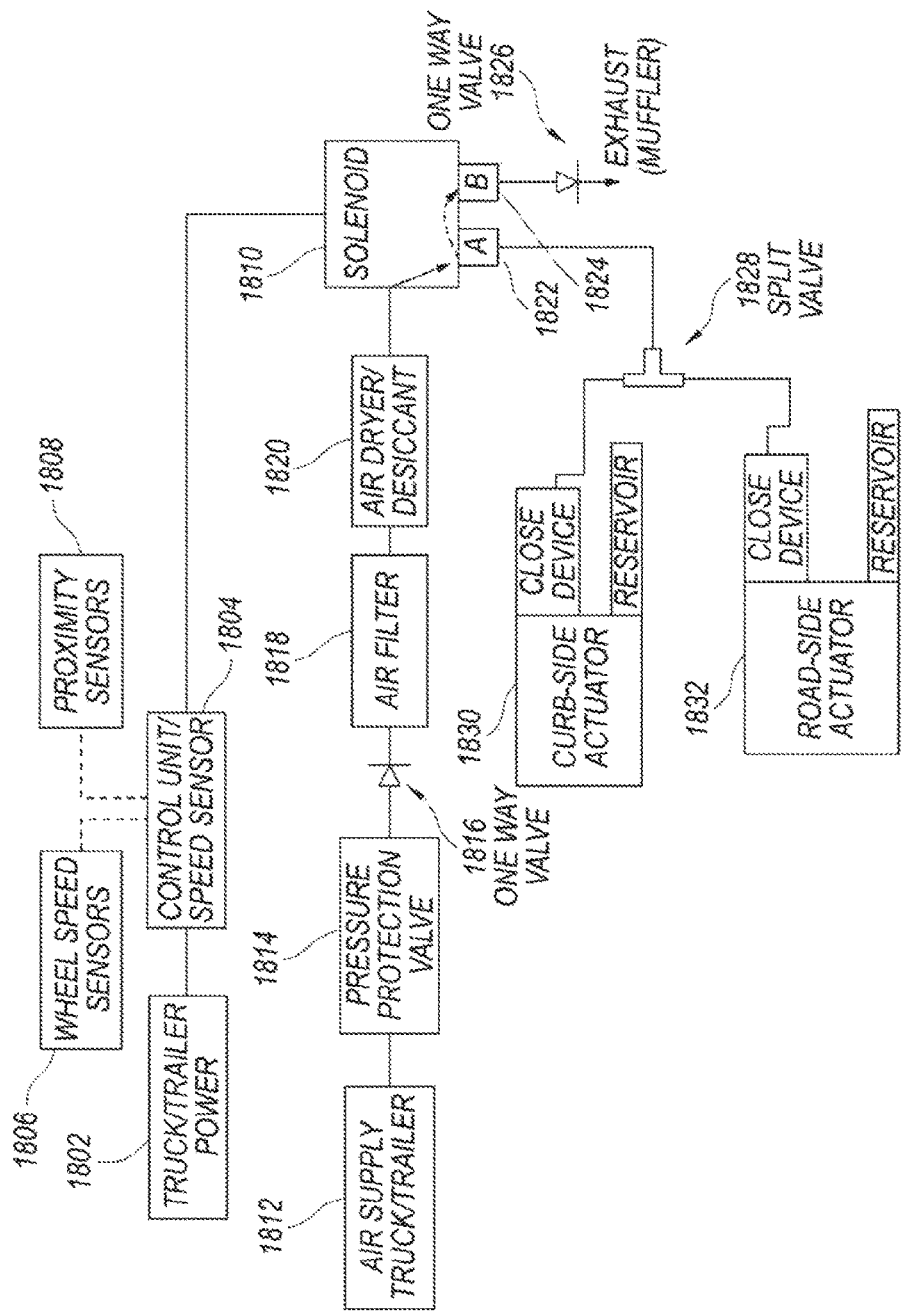
FIG. 21 is a block diagram of a system for controlling a plurality of actuators.

FIG. 21 is a block diagram of a system for controlling a plurality of actuators on a rear of a cargo body of a vehicle. Truck/trailer power system 1802 provides power to electronic control unit/speed sensor 1804, which can receive, detect, and analyze information to determine whether the panels should be retracted. Control unit/speed sensor 1804 can include various sensors such as wheel speed sensors 1806 and proximity sensors 1808.

Control unit/speed sensor 1804 can determine vehicle speed and proximity to other objects using various methods. For example, control unit/speed sensor 1804 can include a built-in accelerometer to analyze vehicle motion, and, in some embodiments, the electronic control unit/speed sensor 1804 can use the vehicle's built-in antilock brake system (ABS) wheel speed sensor to detect speed. Control unit/speed sensor 1804 can be connected to two pressure sensors, one at the rear of the trailer and the other in the air stream, and calculate aerodynamic pressure drag at the rear of the trailer. Control unit/speed sensor 1804 can be connected to an optical reader that calculates vehicle motion by viewing displacement of the ground relative to the vehicle. Control unit/speed sensor 1804 can further include radar.

When control unit/speed sensor 1804 determines that the panels should be retracted (e.g., speed is below a certain threshold, vehicle is in reverse, an object in close proximity is detected, driver manually indicates), a signal is sent to solenoid controlled valve 1810 to actuate an active actuator to retract the panels to a closed or partially closed position. Moving the panels to a closed or partially close position puts the panels into a more favorable crash position (i.e., less damage will be incurred by the panels if the rear end of the cargo body contacts an object). Alternatively, if the active actuator is holding the panel open against the passive actuator force, the signal may de-active the active actuator to allow the passive actuator to retract the panel.

An air supply 1812 can be provided by the truck or trailer or from ambient air. A regulator or pressure protection valve 1814 can control the pressure provided to the system and prevent total loss of pressure to the tractor/trailer in the event of pressure loss in the device's system. The pressure can be controlled by closing the pressure protection valve at a preset pressure above what is needed by the tractor/trailer. The system may include a check valve or one-way valve 1816 to inhibit back flow of fluid, which may cause contamination of the air supply. The check valve or one-way valve 1816 also allows the device's air system to keep pressure in event of system shut off or leak/drain at the supply (tractor/trailer). The air can be passed through air filter 1818 to remove debris and dried using air dryer/desiccant 1820 to remove humidity. Cleaning and dehumidifying the air can increase the reliability and durability of the system. Air enters into solenoid controlled valve 1810 and, when the electronic control/speed sensor 1804 indicates, solenoid controlled valve 1810 allows air to flow via path A to outlet 1822, where it passes through split valve 1828 to curb-side actuator 1830 and/or road-side actuator 1832 to retract the panels. When curb-side actuator 1830 and/or road-side actuator 1832 no longer needs to be activated, the signal to solenoid controlled valve 1810 closes the flow path A from the source to the actuator(s). The actuator side of the solenoid is vented to the atmosphere or the pressure is otherwise bled to de-active the active actuator(s). The pressure in the actuator side of the solenoid controlled valve is vented through vent path B to outlet 1824 through a one way valve 1826 and out the exhaust system.

The panels can be deployed using a passive actuator (e.g., gas spring). The gas spring may be internal to an active actuator or a completely separate component. Additionally, the active actuator can be manually back drivable when it is not energized, allowing for full manual operation of the aerodynamic structure. As mentioned elsewhere, the passive actuator and active actuator may be reversed such that the passive actuator maintains the panel in a closed position while the active actuator deploys the panels.

While the above embodiments are shown with a first actuator that biases the panel in one position (the passive actuator) and a second actuator that overcomes the bias to move the panel to the other position (the active actuator), in certain embodiments, a single actuator may both deploy and retract the panels. For example, the active actuator 1712 described above may have air (or other fluids) directed to opposing sides of a piston contained in the active actuator. A three-way valve may direct the flow of air towards a deploy side or a retract side of the piston. When air is directed to the deploy side of the piston, the air forces the rod out of the active actuator and pushes the panels to the deployed position. When air is directed to the retract side of the piston, the air pulls the rod into the active actuator, pulling the panels to the retracted position.

It should be clear that the illustrative embodiments advantageously provide a deployable rear aerodynamic structure with rigid, flexible, or resilient panels that define the aerodynamic shape and provide a durable, clean-appearing product. This illustrative system, also avoids disadvantages of prior systems that uses relatively low-pressure muscles to provide the final shape (e.g. the aerodynamic surface is, itself, inflated). Such systems exhibit several drawbacks, such as the use of a large amount of material in construction of the structure; a high potential for leakage-related structural failures; the need for a large volume of air to deploy the structure; and difficulty in stowing the structure in a clean and neat manner that avoids damage during storage periods. Conversely, the illustrative system uses relative compact and easy to stow/maintain/replace actuators (e.g., air bladders with a reliable and compact rigid/semi-rigid hinged panel assembly).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present technology, what has been described herein is merely illustrative of the application of the principles of the present technology. For example, while the foregoing describes a number of separate embodiments of the apparatus and method of the present technology, what has been described herein is merely illustrative of the application of the principles of the present technology. For example, as used herein the terms "process" and/or "processor", as used in the context of an electronic control system, should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software including of a non-transitory, computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate system, such as the acting direction of gravity. Also, while one muscle is provided to each panel in an embodiment herein, it is expressly contemplated that one or more panels can be interconnected to a plurality of muscles and that panels can be separately moved by muscles, free of interconnections therebetween. Accordingly, this description is meant to be taken only by way of example, and not to otherwise limit the scope of the described technology.

What is claimed is:

1. A deployable aerodynamic structure for a cargo body of a vehicle comprising:
   one or more proximity sensors;

one or more panels configured to be mounted to the cargo body and movable between a retracted position and a deployed position,
wherein in the deployed position, the one or more panels is configured to extend rearwardly away from the cargo body;
at least one passive actuator coupled to one of the one or more panels and to a rear of the cargo body,
wherein the at least one passive actuator is operable to bias the one or more panels toward the deployed position using a biasing force; and
at least one active actuator coupled to the one of the one or more panels and to the rear of the cargo body,
wherein the at least one active actuator is operable to overcome the biasing force to move the one or more panels toward the retracted position,
wherein the at least one active actuator is operable to retract the one or more panels in response to receiving a signal, wherein the signal is received responsive to a sensed proximity of the vehicle to one or more objects, and
wherein the proximity to the one or more objects is sensed by the one or more proximity sensors.

2. The deployable aerodynamic structure of claim 1 wherein the one or more panels comprise a top panel and a side panel configured to be hingedly mounted respectively on each of a first door and a second door of a pair of doors on the rear of the cargo body.

3. The deployable aerodynamic structure of claim 1 wherein the at least one active actuator is one of a pneumatic actuator, hydraulic actuator, and an electric actuator.

4. The deployable aerodynamic structure of claim 1, wherein the at least one active actuator is operable to retract the one or more panels in response to receiving a signal, wherein the signal is received responsive to a speed of the vehicle.

5. The deployable aerodynamic structure of claim 2, wherein the top panel includes a hinge that divides the top panel into an inner top panel and an outer top panel, and wherein the outer top panel is configured to be hingedly attached to the side panel.

6. The deployable aerodynamic structure of claim 2, further comprising a linkage assembly mounted between the cargo body and one of the one or more panels, wherein the linkage assembly is coupled to the top panel and the cargo body, wherein the at least one active actuator is coupled to the one of the one or more panels via the linkage assembly so that the top panel and the side panel retract concurrently.

7. The deployable aerodynamic structure of claim 2, further comprising a linkage assembly mounted between the cargo body and one of the one or more panels, wherein the linkage assembly is coupled to the top panel and the cargo body, wherein the at least one passive actuator is coupled to the one of the one or more panels via the linkage assembly so that the top panel and the side panel deploy concurrently.

8. The deployable aerodynamic structure of claim 1, wherein the at least one passive actuator comprises at least one of: a spring-loaded cable, a gas spring, a spring-loaded hinge and a mechanical spring.

9. The deployable aerodynamic structure of claim 5, further comprising a linkage assembly mounted between the cargo body and one of the one or more panels, wherein the linkage assembly is coupled to the top panel and the side panel, wherein the at least one active actuator is coupled to the one of the one or more panels via the linkage assembly so that the top panel and the side panel retract concurrently, and wherein in the retracted position, the outer top panel folds over the inner top panel.

10. The deployable aerodynamic structure of claim 9, wherein in the retracted position, the side panel overlies the top panel.

11. The deployable aerodynamic structure of claim 1, wherein the at least one active actuator is a pneumatic actuator, and wherein the at least one passive actuator is a gas spring mechanism.

12. The deployable aerodynamic structure of claim 1, wherein the at least one active actuator is coupled directly to one or more panels, and wherein the at least one passive actuator is coupled directly to the one or more panels.

13. The deployable aerodynamic structure of claim 1, wherein the retracted position comprises a fully retracted position and a partially retracted position, wherein in the fully retracted position, the one or more panels are folded against the rear of the cargo body.

14. The deployable aerodynamic structure of claim 1, wherein the at least one active actuator is operable to retract the one or more panels in response to receiving a signal, wherein the signal is received responsive to a direction of movement of the vehicle.

15. The deployable aerodynamic structure of claim 1, wherein the one or more panels comprise a top panel and a bottom panel configured to be hingedly mounted respectively on each of a first door and a second door of a pair of doors on the rear of the cargo body, and wherein the deployable aerodynamic structure further comprises a linkage assembly mounted between the cargo body and one of the one or more panels, wherein the linkage assembly is coupled to the top panel and the cargo body, wherein the at least one active actuator is coupled to the one of the one or more panels via the linkage assembly so that the top panel and the bottom panel retract concurrently.

16. The deployable aerodynamic structure of claim 1, wherein the one or more panels comprise a top panel and a bottom panel configured to be hingedly mounted respectively on each of a first door and a second door of a pair of doors on the rear of the cargo body, and wherein the deployable aerodynamic structure further comprises a linkage assembly mounted between the cargo body and one of the one or more panels, wherein the linkage assembly is coupled to the top panel and the cargo body, wherein the at least one passive actuator is coupled to the one of the one or more panels via the linkage assembly so that the top panel and the bottom panel deploy concurrently.

17. An aerodynamic structure for a vehicle body comprising:
one or more proximity sensors;
a panel hingedly mounted on the vehicle body; and
at least one inflatable air bladder that is pivotally connected between a portion of the vehicle body and the panel that, in an inflated orientation, maintains the panel in a desired deployed position and that is constructed and arranged to absorb predetermined shock with hinged movement of the panel against biasing pressure of the air bladder,
wherein the at least one inflatable air bladder is operable to retract the one or more panels in response to receiving a signal, wherein the signal is received responsive to a sensed proximity of the vehicle to one or more objects, and
wherein the proximity to the one or more objects is sensed by the one or more proximity sensors.

18. The aerodynamic structure as set forth in claim 17 further comprising a valve that depressurizes the air bladder in response to a predetermined impact force on the panel.

19. The aerodynamic structure as set forth in claim 18 wherein the panel is an aerodynamic side skirt.

20. The aerodynamic structure as set forth in claim 1, further comprising a reservoir and a rod, wherein the at least one active actuator overcomes the biasing force by forcing a fluid into the reservoir to pull the rod into the active actuator, wherein the fluid is fully contained in the reservoir.

\* \* \* \* \*